United States Patent [19]

Wiener et al.

[11] Patent Number: 5,242,514
[45] Date of Patent: Sep. 7, 1993

[54] METHOD FOR THE PRODUCTION OF A HARDENED GUIDE SHAFT FOR A LINEAR GUIDE

[76] Inventors: Richard Wiener, Phillipp-Funk-Strasse 52, D-7080 Aalen 1; Rolf Merz, Bismarckstrasse 53, D-7080 Aalen-Wasseralfingen, both of Fed. Rep. of Germany

[21] Appl. No.: 654,747

[22] Filed: Feb. 13, 1991

Related U.S. Application Data

[63] Continuation of Ser. No. 362,147, Jun. 6, 1989, abandoned.

[51] Int. Cl.$^5$ .................... C21D 1/10; C21D 9/28
[52] U.S. Cl. .................... 148/572; 148/573; 29/893.3; 74/498; 219/10.43; 219/10.59
[58] Field of Search .................... 29/159.2, 893, 893.3; 74/498; 148/147, 148, 149, 150, 154, 12 B, 12 F, 572, 573; 219/10.43, 10.59

[56] References Cited

U.S. PATENT DOCUMENTS

| | | | |
|---|---|---|---|
| 2,299,934 | 10/1942 | Sherman et al. | 148/150 |
| 3,236,993 | 2/1966 | Jones | 219/10.59 |
| 4,021,274 | 5/1977 | Chadwick | 148/150 |
| 4,571,982 | 2/1986 | Bishop et al. | 29/159.2 |
| 4,820,357 | 4/1989 | Davison et al. | 148/12 B |
| 4,855,556 | 8/1989 | Mucha et al. | 148/147 |

OTHER PUBLICATIONS

Metals Handbook 9th Ed, vol. 4; pp. 451-452; 467-468 Nov. 1981.

*Primary Examiner*—R. Dean
*Assistant Examiner*—Margery S. Phipps
*Attorney, Agent, or Firm*—Welsh & Katz, Ltd.

[57] ABSTRACT

A method for the production of a hardened guide shaft for linear guide is disclosed, in which teeth are formed in a shaft, which is then passed through a circular inductor without rotation. The magnetic flux of the circular inductor is controlled to reduce the flux in the area of the teeth, thereby hardening the teeth without overheating them. The remainder of the shaft is hardened through a magnetic flux greater than that supplied to the teeth area.

8 Claims, 2 Drawing Sheets

METHOD FOR THE PRODUCTION OF A HARDENED GUIDE SHAFT FOR A LINEAR GUIDE

This is a continuation of application Ser. No. 362,147 filed Jun. 6, 1989, now abandoned.

This invention relates to a method for the production of a hardened guide shaft for a linear guide, in particular a method for producing a linear guide having a guide carriage provided with spherical bushings, and a guide shaft manufactured according to this method.

BACKGROUND OF THE INVENTION

Linear guides are used for the performance of linear movements in a multiplicity of fields, such as, for example, in mechanical engineering, in handling systems, in the construction of jigs and fixtures and in precision engineering. Linear guides can be used as modules for grabs, robots, sliding tables, supports, measuring instruments, and the like. The principle component of a linear guide is one or two guide shafts on which a guide carriage slides.

In reversal, however, the guide carriage may remain stationary and the shaft or the two shafts moved. For low-friction displacement and a high load-carrying capacity, so-called spherical bushings or linear ball bearings with several ball races are generally utilized in the guide carriage.

The relative movement between the guide shaft and the guide carriage arranged thereon can be accomplished in different ways. One manner of doing this involves ball roll spindles, with a spindle running parallel to the guide shaft and a spindle nut being arranged in the guide carriage. If the spindle is driven, the guide carriage moves accordingly.

One disadvantage with this construction, however, is that besides requiring additional space for the spindle, the mechanism cannot be supported along its length which is thereby limited.

Also well known as a means for a linear drive system are drive systems with notched belts or the like; however, such an approach also requires an increased expenditure for additional components and requires operating room. Furthermore, with the belt drive, the guide shaft cannot be completely supported, which thus has a limiting effect on the overall length.

Another structure known in the art is to arrange a toothed rack parallel to the guide shaft, which works together with a counter-element, such as a pinion, for driving the guide carriage. For this, however, additional components and increased expenditures are also necessary. Furthermore, such a linear guide is subject to limitations in its use.

SUMMARY OF THE INVENTION

An object of the subject invention is therefore to create a linear guide or guide shaft for a linear guide which can be used universally.

Another object of the subject invention is a linear guide with a short overall length and a high load-carrying capacity.

According to the subject invention, the above problems are solved by introducing gear teeth onto a shaft over a partial circumferential area of the shaft, after which the area of the shaft with the teeth is heat-treated to harden it and subsequently trued and ground, as known in the art.

According to the subject invention, gear teeth are integrated on the guide shaft itself, to permit relative movement between a guide shaft and a guide carriage. In this way, it is necessary only to arrange for a counter-element, which will in general be a pinion in the guide carriage. Further components, besides the usual drive equipment, such as, for example, a drive motor, are not necessary. The guide shaft thus assumes a dual function, permitting the omission of additional components and at the same time achieving a size reduction in the mechanism. The gear teeth may be either straight or helical toothing.

A very significant further advantage of the invention is that the drive base or guide shaft can be supported by mounting and fastening it with, for example, bolts. In this way a geometrically defined and vibration-free guideway is created, which can withstand very high loads. Furthermore, any desired number of guide shafts can be arranged one after the other, being careful only that there is a trouble-free transition of the gear teeth section.

In this way linear guides of any desired length can be arranged in rows. With only one guide shaft, a lock against rotation and movement can be obtained in a simple and well-known way with grooves, bars or a flattening of the guide shaft.

Sufficient hardness of the shaft necessary in particular for guide carriages with spherical bushings can be achieved in several ways. Preferably, the shaft is hardened inductively with a circular inductor, with the magnetic flux being controlled in such a way that the magnetic flux is lower in the area of the toothing than in the remaining area. Until now it has been considered impossible to economically provide a surface-hardened guide shaft with a tooth system.

Grinding a tooth system into the hardened guide shaft generally requires unjustifiably high expenditures. Furthermore, with increasing tooth size, the unhardened portion in the central and lower area of the teeth in the tooth roll-off region would increase, since the hardened surface layer would be partly penetrated during the grinding procedure. Introducing the toothing before the hardening procedure has also been regarded as unfeasible. With inductive hardening, using a circular inductor, which would also attempt to achieve sufficient hardening of the non-toothed part of the shaft, distinct overheating in the tooth area should be expected, and would have lead to the breaking of some teeth during subsequent quenching.

Although basically case-hardening of a guide shaft would also come into consideration, in addition to other disadvantages, the depth of hardness thereby obtained would not be sufficient, especially for large carrying loads and with the use of spherical bushings. Furthermore, in the case of non-rusting materials such a hardened guide shaft would lose, at least on the exterior, its freedom from corrosion due to recarburization.

Through the control of the magnetic flux according to the invention during inductive hardening, however, the problems to be expected are, in a surprising way, avoided. By means of appropriate reduction of the magnetic flux in the area of the toothing and thus a reduction of the vortex flow, heat is supplied to a small extent in this area, but this is sufficient to bring the toothed area of the guide shaft up to the desired hardness without undesirable overheating occurring. The gear teeth can, in the process, also become tougher and thus better withstand jerky loads.

The major feature in the inductive hardening according to the subject invention is that the toothed area does not receive as high a temperature as the remaining area of the guide shaft.

In a further embodiment according to the subject invention, the guide shaft to be hardened is pushed unturned through the circular inductor, and the circular inductor provides an increased magnetic flux in the non-toothed area of the guide shaft.

By means of a suitable arrangement of parts which change the magnetic flux, such as sheet-metal packages, about the shaft, the magnetic flux can be controlled in the desired manner and thus the hardness of the teeth selectively influenced.

In this procedure, it is necessary to deviate from customary inductive hardening practice and push the guide shaft to be hardened through the inductor without any rotation; otherwise, the magnetic flux could not be readily controlled or take effect in the desired manner.

If necessary, hardening the teeth could be controlled by special cooling measures after the inductive hardening operation.

In the production of the guide shaft according to the subject invention, various materials are possible. For example, inductively hardenable carbon steels of the following composition can be used:

| | |
|---|---|
| Carbon: | 0.5–0.6% |
| Silicon: | 0.15–0.35% |
| Manganese: | 0.4–0.7% |
| Phosphorus: | max. 0.025% |
| Sulphur: | max. 0.035% |

Such steels are listed in DIN 1712.

Rustfree, acid-resistant, and hardenable martensitic steels can also be used for this. One possible materials composition for this has the following alloy components:

| | |
|---|---|
| Carbon: | 0.85–0.95% |
| Silicon: | max. 1% |
| Manganese: | max. 1% |
| Chromium: | 17–19% |
| Molybdenum: | 0.9–1.3% |
| Vanadium: | 0.07–0.12% |
| Phosphorus: | max. 0.045% |
| Sulphur: | max. 0.030% |

Also possible for this purpose are anti-friction bearing steels, which may also be rustfree.

A further advantage over the hardening method known in the art is that with inductive hardening according to the subject invention the guide shaft can be subjected to heat treatment before inductive hardening.

With this procedure, the core and transition area of the guide shaft can be heat treated in order to increase the core strength, making possible a very high shaft strength load. The gear teeth can be formed before or even after the heat treatment operation, after which the inductive hardening operation is then carried out. Due to the previous heat treatment, the core cross-section is significantly increased in its yield point and strength.

The arrangement of the toothed area of the guide shaft on installation in a linear guide can be as desired, representing a further advantage of the invention. In particular, in this way the drive unit can always be optimally adapted to current conditions. For example, the toothing can be arranged on the upper side, on the underside and also, if need be, laterally. In particular, if the gear teeth are placed on the upper side or laterally, the guide shaft can be supported on the underside for high loads.

Described in principle in the following is one embodiment of the invention with reference to the drawings.

DETAILED DESCRIPTION OF THE INVENTION

Figure 1:
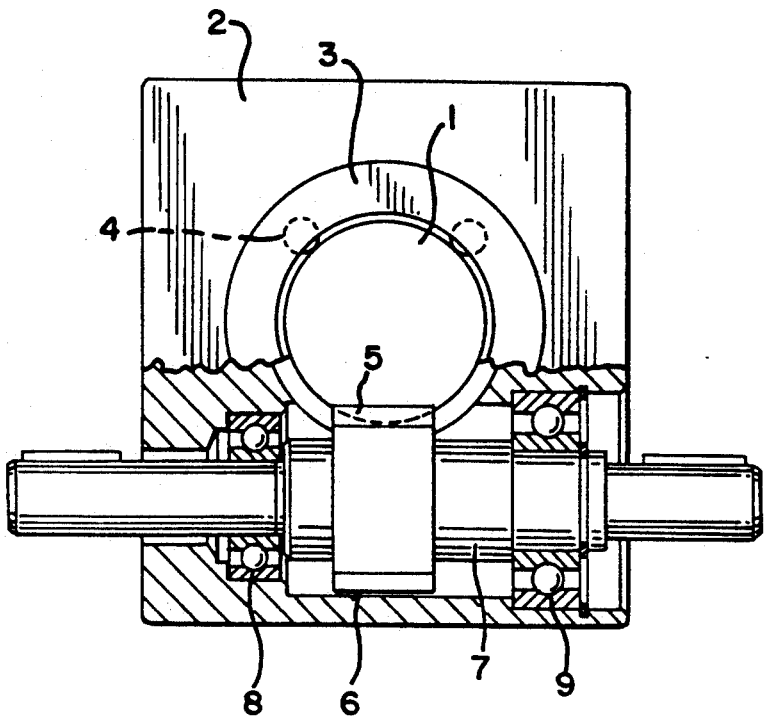
FIG. 1 is a linear guide with a guide shaft, partially in cross-section.

Referring now to FIG. 1, in a simple embodiment the linear guide exhibits a guide shaft 1, which is surrounded by a guide carriage 2. Disposed in the interior of the guide carriage 2 is a spherical bushing 3 with a total of four ball races 4 distributed about the circumference. Instead of a spherical bushing, a sliding guide or a plain bearing can also be used. As guide shafts, solid or hollow shafts can be used, since the nature and embodiment of the guide shaft is fundamentally as desired for the invention.

In the lower area, the guide shaft 1 is provided with transverse toothing 5 on approximately one fifth of its circumferential area. The width and the height of the teeth in this case will depend on the application. The size of the circumferential in which the gear teeth are introduced into the guide shaft 1 is thus of course also dependent on the spacing of the ball races 4, since the toothing can extend only in the intermediate space.

In the guide carriage 2 is furthermore fastened a pinion 6 on a drive shaft 7. The drive shaft 7 is mounted in ball bearings 8 and 9. On one side, a drive motor 10 (see FIG. 4) is connected to the guide shaft 7 and at the same time flange-mounted on this side to the guide carriage 2. The drive shaft 7 may also terminate in the guide carriage 2. If, however, as in the embodiment shown in FIG. 1, it is led out on the opposite side, in this way a drive connection to a second guide shaft can be achieved, with which a linear guide with two guide shafts 1 arranged at a distance from each other is obtained.

Figure 2:
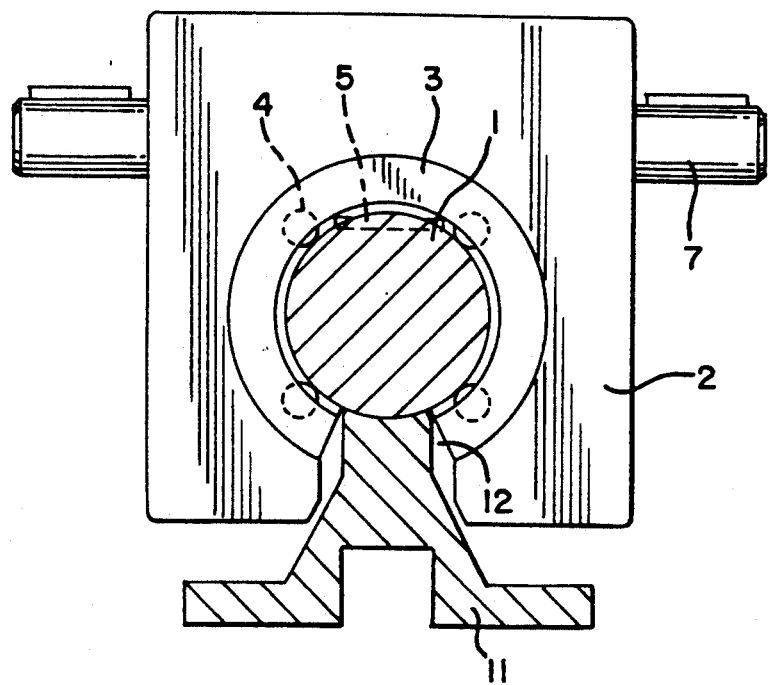
FIG. 2 is a linear guide with a guide shaft in a different embodiment.

FIG. 2 shows diagrammatically a linear guide similar to that in FIG. 1. One difference in this embodiment comprises the gear teeth 5 which lies on the upper side of the guide shaft 1, or the guide shaft 1 is so installed that the gear teeth lay on the upper side. The drive connection can in this case be made in the same way as shown in FIG. 1, with only the ends of the drive shaft 7 projecting out of the guide carriage 2. The advantage of this embodiment is that the guide shaft 1 can be mounted on the underside of a bearing pedestal or a bearing rail 11. It is thereby only necessary to provide a spherical bushing 3 in the customary way, which may be on the underside with a slot 12.

Figure 3:
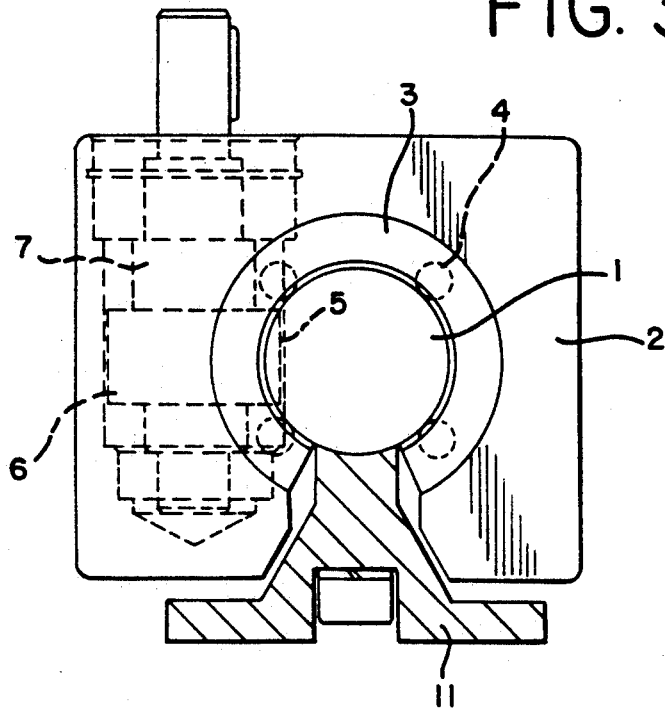
FIG. 3 is a further variant of a linear guide with a guide shaft.

Shown in FIG. 3 is a third embodiment where, in this case, the guide shaft 1 is so installed that the gear teeth are arranged laterally and work together with a drive shaft 7 on which the pinion 6 is arranged; the drive shaft has a vertical longitudinal axis. In this way the guide shaft 7 can be supported on a bearing rail 11.

The drive motor 10 for the drive is flange-mounted on the upper side of the guide carriage 2.

Figure 4:
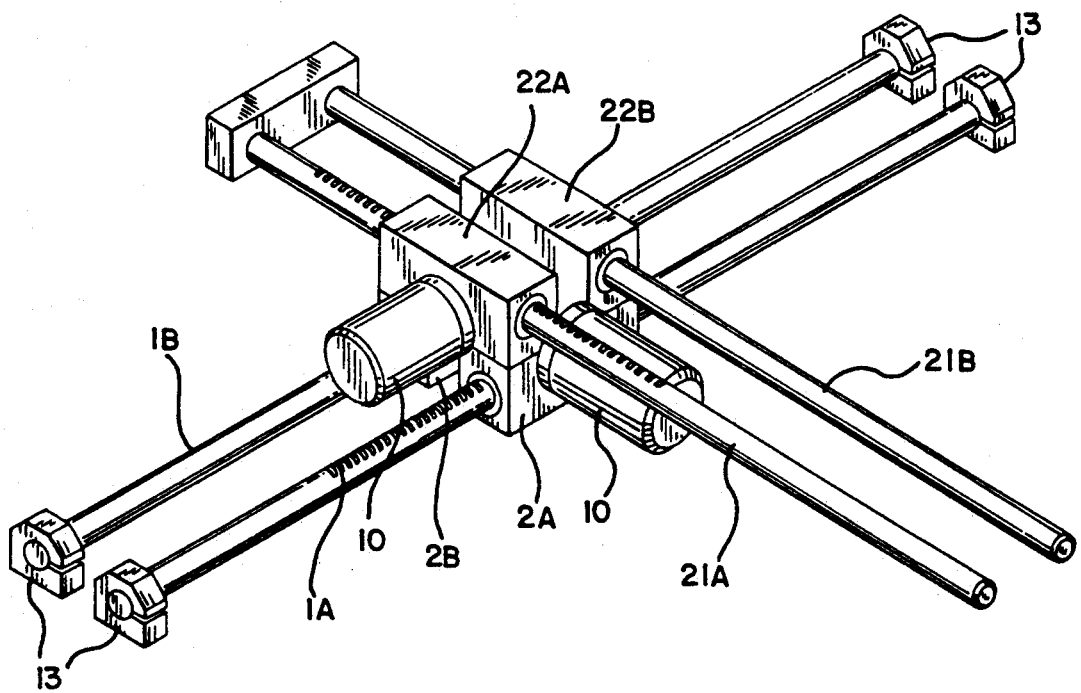
FIG. 4 shows two interconnected linear guides, each with two guide shafts for two-axis shifting.

With the guide shaft 1 provided with the gear teeth 5 as core, linear guides can be arranged in any desired way and in particular also put together in the form of modules. Such an embodiment is shown in FIG. 4.

As can be seen, two guide shafts 1A and 1B and 21A and 21B each work together with guide carriages 2A and 2B and 22A and 22B, respectively. As can be seen, in each case guide shaft 1A or 21A is provided with gear teeth 5, with in each case a drive motor 10 ensuring drive. The two guide shafts 1B and 21B do not possess any separate drive and thus also no gear teeth 5. If it is needed, these two guide shafts can also each be driven by the same motor.

The shown combined linear guide, which makes possible movements in two axial directions, is mounted in bearing 13. As further evident, guide carriages 2A, 2B, and 22A and 22B are substantially identical in design and also possess connecting parts at the same points (not shown). In this way the guide carriages can be connected to each other in any desired way, resulting in a virtually unlimited combinations. For example, it is also possible to provide one or two guide carriages fastened to the bottom guide carriages 2A and 2B in addition to the two guide rails 22A and 22B at the top and make possible movement in a third axial direction.

The guide shaft 5 can be manufactured in the following way:

The transverse gear teeth may be ground into the guide shaft while still soft. Milling, slotting, rolling, or other process for forming teeth may also be used.

If required, heat treatment of the shaft can be conducted in the customary way beforehand; thus the shaft may be heated up, quenched, and again reheated and quenched until the desired heat treatment is reached. This method involves general state of the art knowledge and will therefore not be explained in further detail at this point.

The inductive heating operation takes place in a circular inductor through which the guide shaft to be hardened is pushed without rotation. Sheet-metal packages arranged around the circumference of the circular inductor are used for control of the magnetic flux and are appropriately placed so that a higher magnetic flux and thus a higher temperature arises in areas without gear teeth. The inductive heating operation itself is likewise commonly known, and will therefore not be explained in further detail here.

Inductive surface hardening is a process in which a very high temperature is generated in a surface zone of the workpiece, limited by depth; through quenching, local hardening of the heated areas is achieved. Depending on the frequency of the heating and quenching cycle, case-hardening depths of several millimeters can be produced. An induction system comprises essentially a frequency generator and a working device. In the frequency generator, the frequency of the power supply is converted into a single-phase alternating current of higher frequency. The working device itself is the inductor proper, which has to accommodate the workpiece to be heated and perform all necessary movements. In the case of lengthy workpieces, as in the present case with the guide shafts, either the guide shaft is pushed through the inductor or the inductor is guided along the guide shaft. The uniform movement of the inductor relative to the stationary workpiece or vice versa makes it possible to progressively generate an annealing zone on the guide shaft. The water jet of a quenching spray running along with it then continuously performs the hardening operation.

The case-hardening depths are adjusted for the respective shaft diameter range and take into account, among other things, the surface pressures to be encountered, which are transmitted to or exerted on the linear guide shaft by, for example, linear longitudinal ball bearings at different loads.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, buy that the invention will include all embodiments and equivalents falling within the scope of the appended claims.

Various features of the invention are set forth in the following claims.

What is claimed:

1. A method for forming a hardened guide shaft for a linear guide comprising the steps of:
   1) forming gear teeth on the guide shaft over a partial circumferential area;
   2) controlling the magnetic flux generated by a circular inductor by lowering the magnetic flux and the vortex flow over said partial circumferential area in comparison to the remaining shaft area;
   3) pushing the guide shaft to be hardened with uniform movement and without rotation through said circular inductor; and
   4) quenching and hardening the guide shaft.

2. The method of claim 1, further including the step of fitting sheet-metal packages over a portion of the periphery of said circular inductor for controlling the magnetic flux generated by said circular inductor.

3. The method of claim 1, further including the step of using induction-heatable steels with a carbon content of more than 0.4% to form the guide shaft.

4. The method of claim 1, further including the step of using a carbon steel with the following composition in percent by weight of the non-ferrous components to form the guide shaft:

| Carbon: | 0.5–0.6% |
|---|---|
| Silicon: | 0.15–0.35% |
| Manganese | 0.4–0.7% |
| Phosphorus: | max. 0.025% |
| Sulphur: | max. 0.035% |
| Iron: | Balance |

5. The method of claim 1, further including the step of using rustfree acid-resistant hardenable steels to form the guide shaft.

6. The method of claim 1, further including the step of using the following material composition in percent by weight as non-ferrous components to form the guide shaft:

| | |
|---|---|
| Carbon: | 0.85–0.95% |
| Silicon: | max. 1% |
| Manganese: | max. 1% |
| Chromium: | 17–19% |
| Molybdenum: | 0.9–1.3% |
| Vanadium: | [0.7] 0.07–0.12% |
| Phosphorus: | max. 0.045% |
| Sulfur: | max. 0.030% |
| Iron: | Balance |

7. The method of claim 1, further including the step of using anti-friction bearing steels to form the guide shaft.

8. The method of claim 1, further including the steps of heat treating the guide shaft before inductive hardening.

* * * * *